United States Patent [19]

Cragun

[11] Patent Number: 5,550,564
[45] Date of Patent: Aug. 27, 1996

[54] SELF CLEANING TOUCH SCREEN DISPLAY MECHANISM

[75] Inventor: Brian J. Cragun, Rochester, Minn.

[73] Assignee: International Business Machines Corporation, Armonk, N.Y.

[21] Appl. No.: 368,247

[22] Filed: Jan. 3, 1995

Related U.S. Application Data

[63] Continuation of Ser. No. 165,239, Dec. 10, 1993, abandoned.

[51] Int. Cl.$^6$ .................................................. G09G 3/02
[52] U.S. Cl. .................................................. 345/173
[58] Field of Search ........................... 345/173, 156, 345/174, 175, 176, 177; 178/18, 19; 341/22

[56] References Cited

U.S. PATENT DOCUMENTS

| | | | |
|---|---|---|---|
| 4,721,970 | 1/1988 | Beaver | 354/21 |
| 4,857,946 | 8/1989 | Tominaga et al. | 354/173.1 |
| 5,030,944 | 7/1991 | Masimo et al. | 345/126 |
| 5,054,063 | 10/1991 | Lo et al. | 379/452 |

FOREIGN PATENT DOCUMENTS

193038  10/1985  Japan .................................. 345/175

*Primary Examiner*—Raymond J. Bayerl
*Assistant Examiner*—Doom Chow
*Attorney, Agent, or Firm*—Steven W. Roth

[57] ABSTRACT

A source roller containing transparent film is mounted below a kiosk's touch screen within the kiosk's enclosure. A portion of the transparent film is manually unwound and connected to a take-up roller mounted above the kiosk's display. The source and take-up rollers are mounted in a way that ensures that the film comes into contact with the touch screen. When a kiosk user enters information via the touch screen, the soil and other residue from the user's hands comes into contact with the film instead of the touch screen itself. Timers, optical sensors, and motors are used to advance the transparent film whenever it becomes dirty.

15 Claims, 6 Drawing Sheets

SELF CLEANING TOUCH SCREEN DISPLAY MECHANISM

This application is a continuation of application Ser. No. 08/165,239, filed Dec. 10, 1993.

FIELD OF THE INVENTION

The present invention relates to data processing systems. More particularly, the present invention relates to touch screen technology.

BACKGROUND OF THE INVENTION

The development of the EDVAC computer system of 1948 is often cited as the beginning of the computer era. While the EDVAC computer system was a significant scientific accomplishment for 1948, it was so big that it took up 500 sq. ft of floor space and included 3,500 vacuum tubes. Since that time, computer systems have become so small and so powerful that they have found their way into just about every aspect of the American life style. Computer systems are found in devices as common as the ordinary television set and in devices as complex as space shuttles.

Some of the more recent uses of computer systems have been brought about by the advent of the touch screen. Touch screen technology allows the computer user to enter information into the computer through the display screen itself. Before touch screen technology, computer system users were forced to enter information through the use of a keyboard or other similar device. While this method worked fine in an office environment, it made it more difficult to incorporate computer systems into smaller environments like automobiles and cockpits.

Today, touch screens have become so popular that they, like computer systems themselves, can be found just about anywhere. For example, touch screens are used in automobiles and on automatic teller machines (ATMs) and other kiosk type devices. There is, however, one significant problem with touch screens; they get dirty. The combination of the visual output of information and the "hands on" input of information is an inherent cleanliness problem. Nowhere is this problem more apparent than in the case of a public kiosk. Kiosks placed in shopping malls and outside of fast food restaurants are constantly in need of a good cleaning.

To the kiosk owner, this general sanitary concern quickly becomes an economic one. While many people would think nothing of using a public phone, they might well hesitate to use a touch screen that looked "greasy and grimy." Public disdain for a grimy touch screen amounts to lost profits for the kiosk owner.

Because of these sanitary and economic concerns, kiosk owners pay large sums of money to maintenance personnel to keep their kiosks from becoming dirty and unappealing to the public. Of course, this is really an unfortunate situation given that the primary reason for having a kiosk in the first place is to reduce the kiosk owner's expenses.

SUMMARY OF THE INVENTION

It is, therefore, a principal object of this invention to provide an enhanced self cleaning display.

It is another object of this invention to provide an enhanced computer system with a self cleaning display.

It is still another object of this invention to provide an enhanced, self cleaning touch screen display.

These and other objects of the present invention are accomplished by the self cleaning touch screen display mechanisms disclosed herein.

While the present invention applies to any visual display apparatus (e.g., television picture tubes and personal computer displays), its advantages are most apparent when applied to a touch screen incorporated into a public kiosk. A source roller containing transparent film is mounted below the kiosk's touch screen within the kiosk enclosure itself. A portion of the transparent film is manually unwound and connected to a take-up roller mounted above the kiosk's display. The source and take-up rollers are mounted in a way that ensures that the film comes into contact with the touch screen. When a kiosk user enters information via the touch screen, the soil and other residue from the user's hands comes into contact with the film instead of the touch screen itself. Timers, optical sensors, and motors are used to advance the transparent film whenever it becomes dirty.

The self cleaning display mechanism also includes a notification mechanism for alerting service personnel of the need for a new roll of film.

DETAILED DESCRIPTION

Figure 1A:
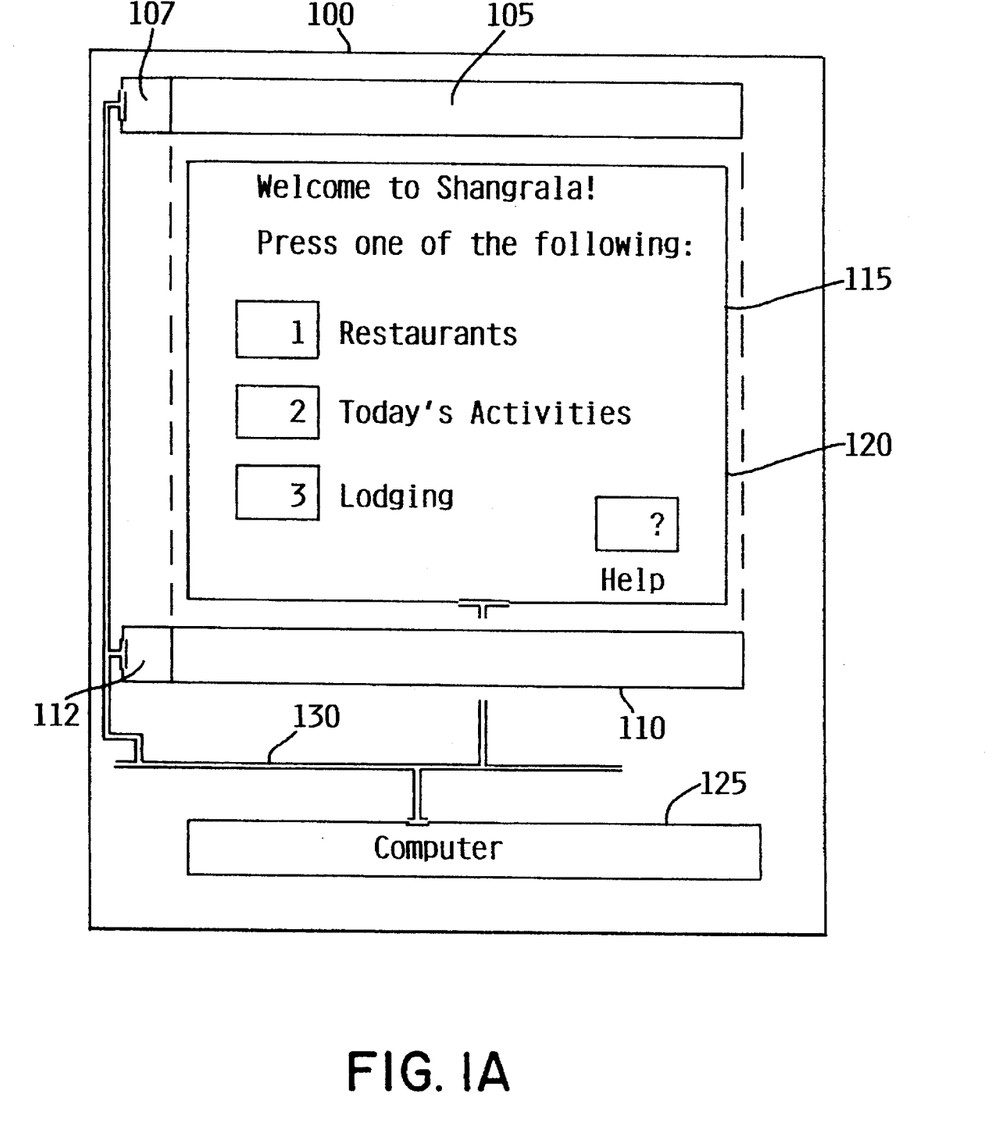
FIG. 1A is a block diagram of the kiosk of the present invention.

FIG. 1A shows a block diagram of kiosk 100 of the present invention. Kiosk 100 comprises stepper motor 107, magnetic particle brake 112, take-up roller 105, source roller 110, display 115, transparent film 120, and computer system 125. Motor 107, display 115, and computer system 125 are all interconnected via bus 130. Magnetic particle brake 112 is affixed to the axle (not shown) of source roller 110.

According to the preferred embodiment, stepper motor 107 is an Airpax C82711-M1, stepper motor; magnetic particle brake 112 is a Sofslip permanent magnet tensioner; Transparent film 120 is 3M Write On Film which is 2.3 mils thick, 11¼ inches wide, and 50 feet long. However, those skilled in the art will recognize that the present invention is not limited to the particular motor, clutch, and/or transparent film used in the preferred embodiment and that any motor, clutch, and/or transparent film having the same or similar characteristics could be used.

Source roller 110 is a cardboard roll containing pre-wound transparent film 120. Depending upon the situation, transparent film 120 may or may not be treated prior to installation. Pre-treating transparent film 120 may be done when it is beneficial to dispense a particular chemical onto the hands of the user of kiosk 100. Chemicals used can range from a disinfectant for use in hospitals to a powder for use in crime detection. Take-up roller 105, like source roller 110, is a cardboard roller. The leading edge of transparent film 120 is eventually attached to take-up roller 105. Initially, most of transparent film 120 resides on source roller 110. When soiled, transparent film 120 is moved onto take-up roller 105. Display 115 is an IBM 8516 touch screen display. However, with the exception of some touch screen displays, it will be understood by those skilled in the art that the present invention applies equally to most all types of displays; be they touch screen displays or conventional, non-touch screen displays.

Figure 1B:
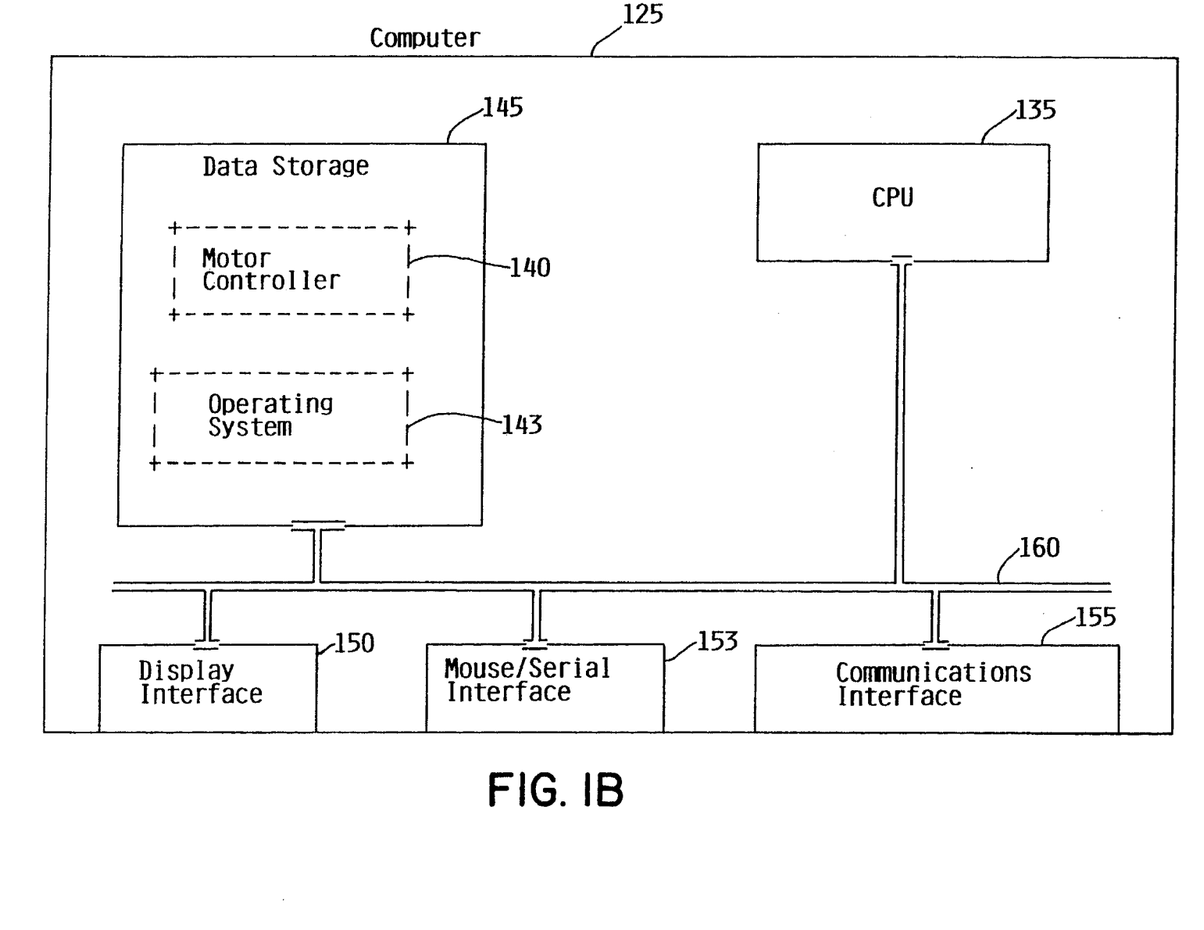
FIG. 1B is a block diagram of the computer system of the present invention.

FIG. 1B shows the computer system of the present invention. As shown in the exploded view of FIG. 1B, computer system 125 comprises main or central processing unit (CPU) 135, data storage 145, display interface 150, serial/mouse interface 153, and communications interface 155. CPU 135, data storage 145, display interface 150, serial/mouse interface 153, and communications interface 155 are all interconnected by internal bus 160.

CPU 135 is an Intel 80486 microprocessor; however, alternative processors such as the Motorola 68040 could also be used. Display interface 150 is an IBM XGA Display Adapter Card. In the preferred embodiment, display 115 is connected to both display interface 150 and the Serial/Mouse interface of computer system 125 (not shown). It should be understood, however, that the present invention applies equally to displays which have a single connection to a display interface. Communications interface 155 is used by computer system 125 to communicate with other computer systems. In the preferred embodiment, communications interface 155 is a Personal System/2 300/1200 Internal Modem. However, those skilled in the art will recognize that alternative connection means, such as those used in local and wide area networks, could be used.

Data storage 145 contains motor controller 140, and operating system 143. While data storage 145 is shown as a monolithic entity, it should be understood that it may comprise a variety of devices, and that all programs and files shown will not necessarily be contained in any one device. For example, motor controller 140 will typically be loaded into primary memory to execute, while source data files will typically be stored on magnetic or optical disk storage devices. Motor controller 140 is discussed in detail in the text accompanying FIG. 2B.

Figure 2A:
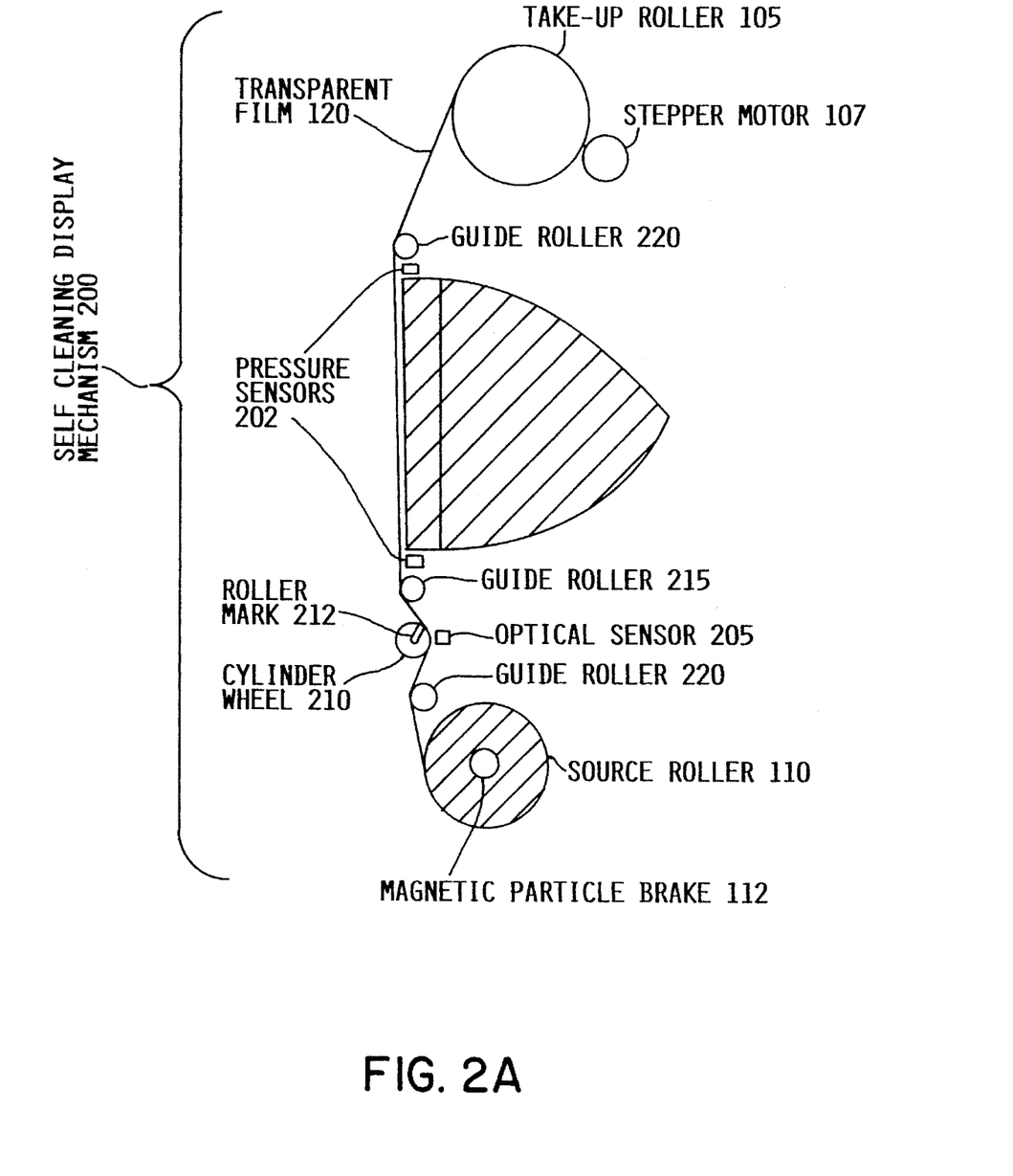
FIG. 2A is a cross section diagram of the self cleaning display mechanism of the present invention.
Figure 2B:
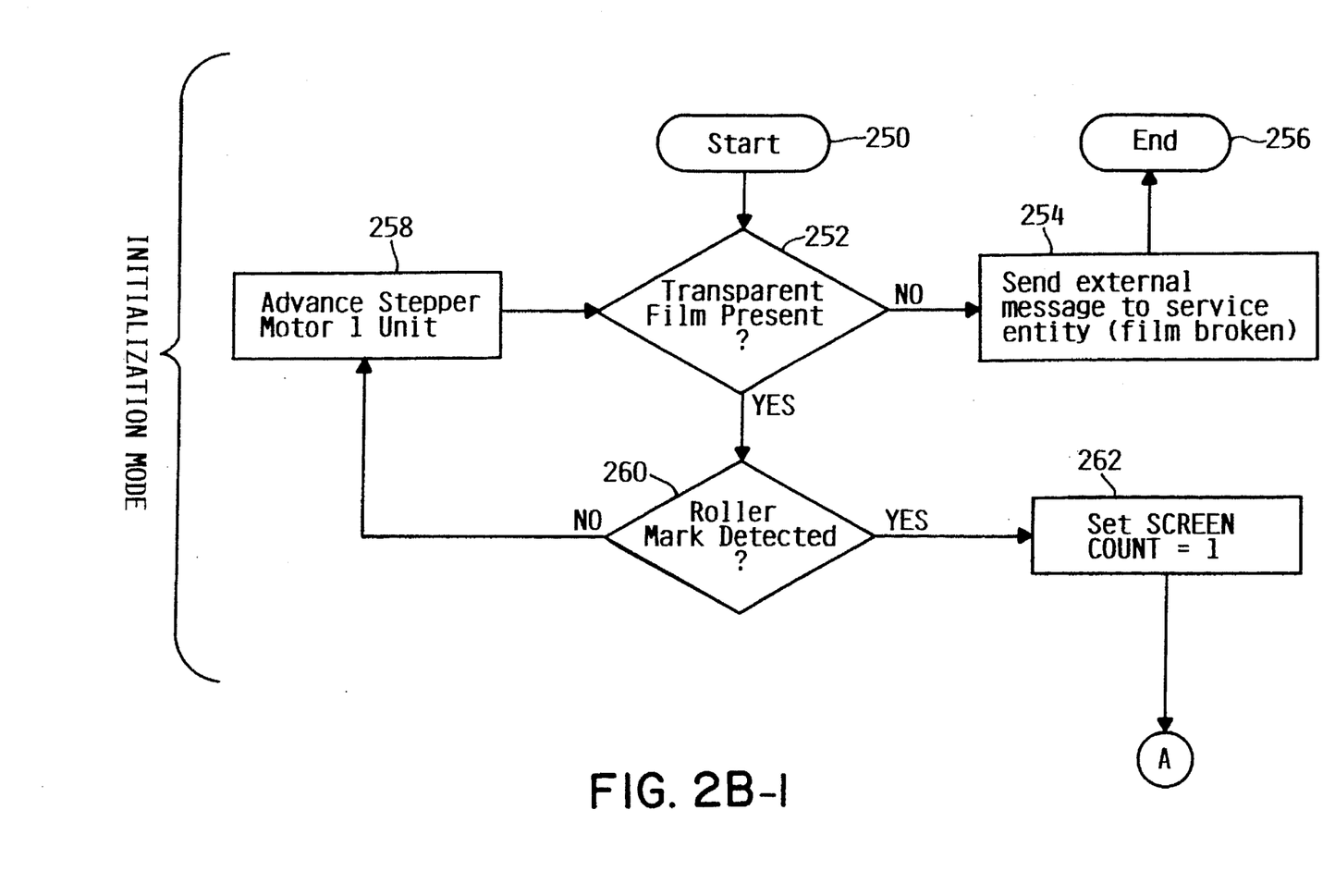
FIG. 2B is a flow diagram the motor controller of the present invention.
Figure 2B:
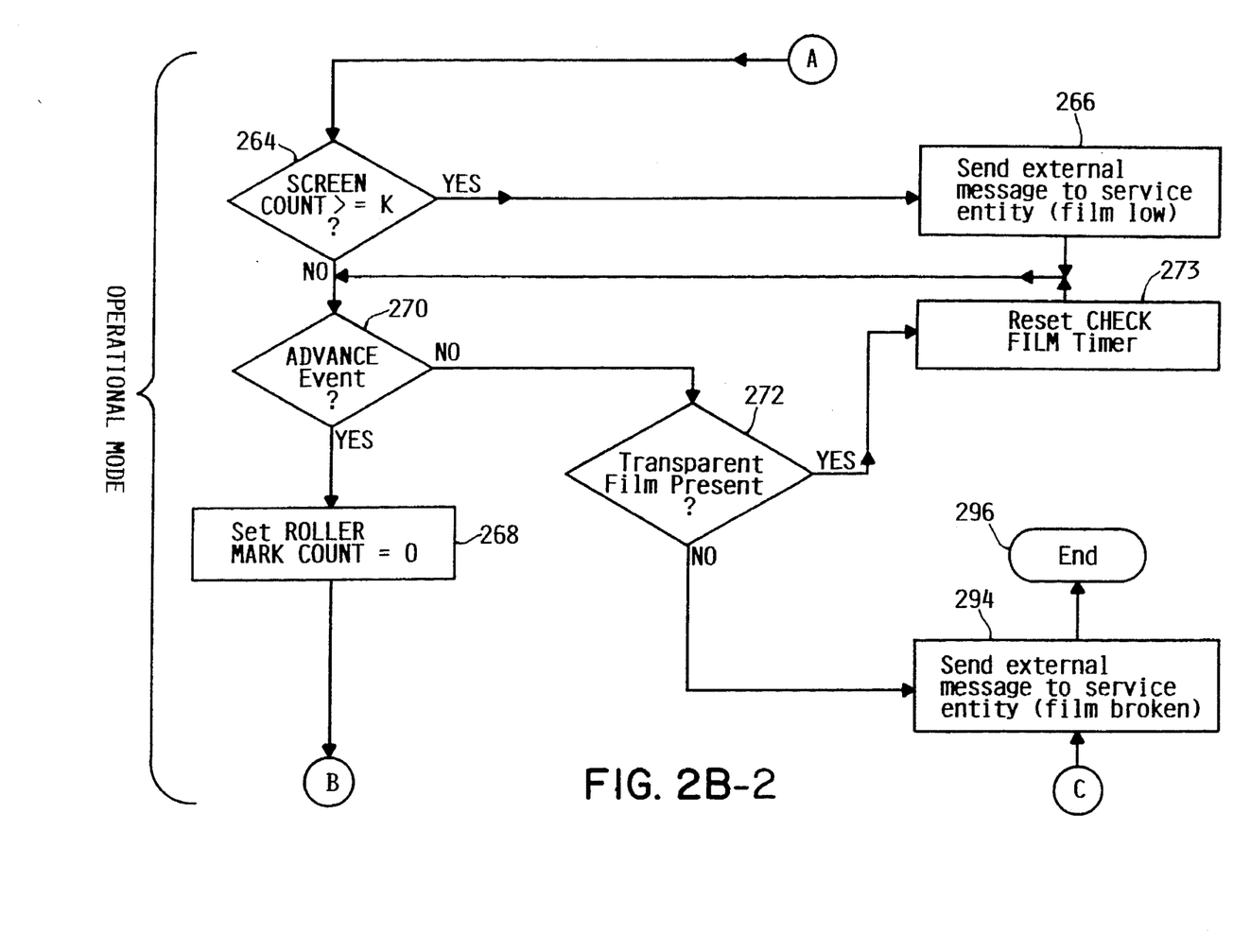
Figure 2B:
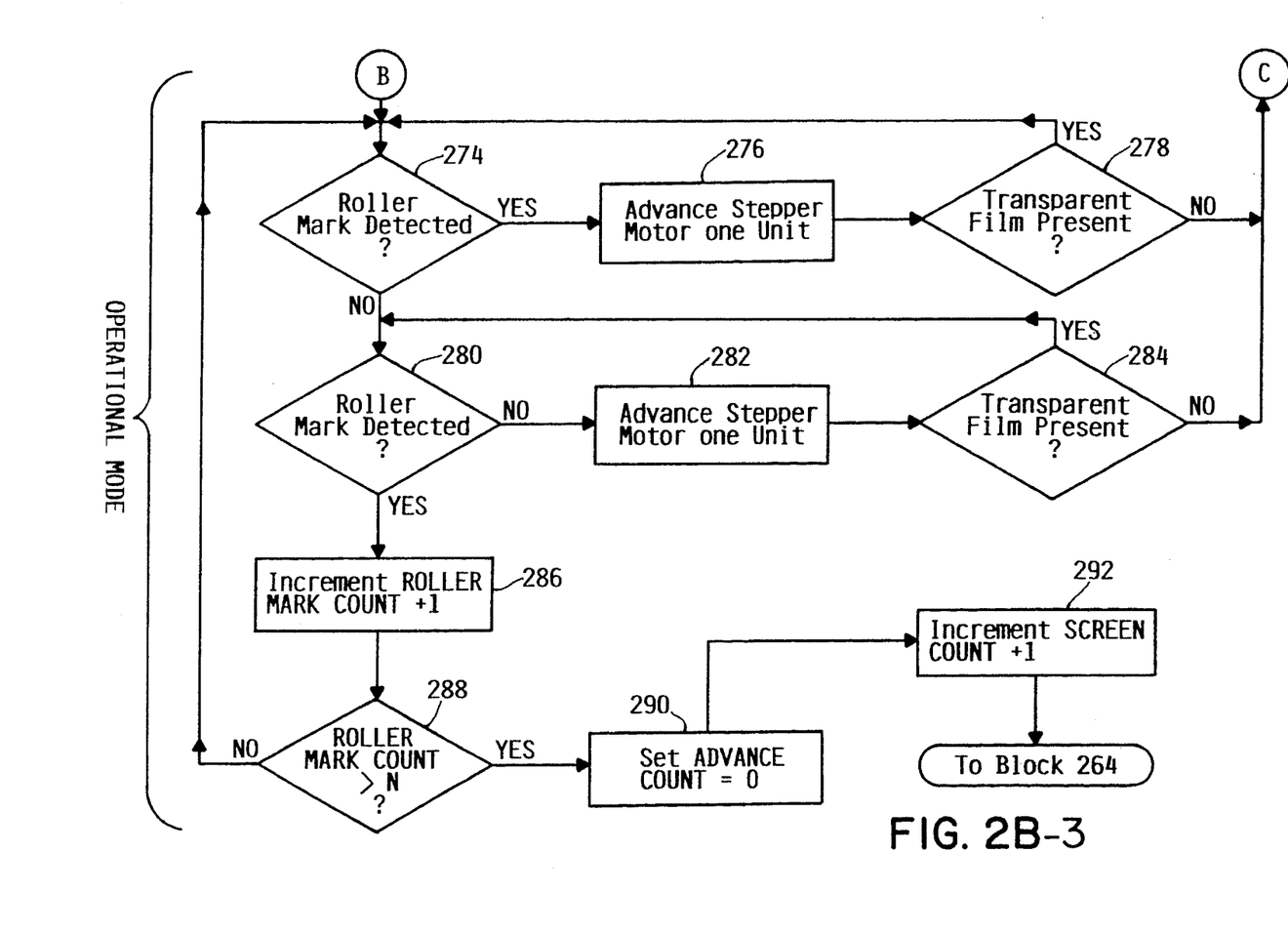

FIG. 2A is a cross sectional diagram of self cleaning display mechanism 200. To install a new roll of transparent film 120 onto self cleaning display mechanism 200, a service technician replaces source roller 110 with a full roll of transparent film 120. When manufactured and wound onto a cardboard roll, transparent film 120 has an exposed end. This exposed end is used to unwind the roll in much the same way as every day plastic wrap and tin foil are unwrapped to cover a food container.

After the service technician has replaced source roller 110 with a full roll of transparent film 120, the service technician manually winds the exposed end of transparent film 120 such that it is disposed between cylinder wheel 210 and optical sensor 205. As shown, guide rollers 215 and 220 are in place to ensure that transparent film 120 remains in contact with cylinder wheel 210 and not with optical sensor 205. Also shown is roller mark 212 on cylinder wheel 210. Roller mark 212 is used in connection with optical sensor 205 to keep track of how much of source roller 110 has been used and how much is remaining. Transparent film 120 is then extended across pressure sensors 202, display 115, and guide roller 220. Lastly, transparent film 120 is attached to take-up roller 105.

Magnetic particle brake 112 is used to provide reverse tension such that transparent film 120 is kept taut. Magnetic particle brakes are well known in the art for use in axial delivery systems. When instructed to do so by computer 125, stepper motor 107 advances transparent film 120 onto take-up roller 105. Since it is important to ensure that transparent film 120 remains in contact with display 115, pressure sensors 202 are set up to respond to queries by computer 125. When queried, pressure sensors 202 inform computer system 125 whether transparent film 120 has lost contact with display 115. Transparent film 120 could lose contact with display 115 because transparent film 120 had broken, been tampered with, or simply been used up. Computer 125 is connected to pressure sensors 202 and optical sensor 205 via bus 130 (not shown).

While FIG. 2A shows a top to bottom roller configuration, it will be understood by those skilled in the art that other configurations, such as a side to side roller configuration, are also possible within the spirit of the present invention.

FIG. 2B is a flow diagram of motor controller 140 of the preferred embodiment. Blocks 250 through 262 represent the initialization mode of motor controller 140 while blocks 264 through 296 represent the operational mode of motor controller 140. Motor controller 140 is placed in initialization mode by computer 125 whenever Kiosk 100 is "powered-on" or whenever a service technician replaces an expired roll of transparent film 120 with a new roll. For the most part, however, motor controller 140 is executing in its operational mode.

The initialization mode of motor controller 140 begins in block 250. Motor controller 140 first queries pressure sensors 202 to determine whether transparent film 120 remains in contact with display 115 [block 252]. If transparent film 120 is not present, motor controller 140 uses communications interface 155 to dispatch an external message indicating that there is a problem with transparent film 120 [block 254]. It will be understood by those skilled in the art that such an external message can be dispatched in any number of ways (e.g., through the use of a modem, etc.) and be sent to any number of destinations (e.g., a central service computer). In the event such a message is dispatched, motor controller 140 will terminate execution in block 256.

If in block 252, motor controller 140 determines that all is well with transparent film 120, it proceeds to determine whether roller mark 212 is present by querying optical sensor 205. If roller mark 212 is not present, motor controller 140 first instructs take-up roller 105 to advance transparent film 120 one unit [block 258]. Motor controller 140 then loops back to check for the presence of transparent film 120 [block 252] and again looks for roller mark 212 [block 260]. This initialization process continues until roller mark 212 is detected by motor controller 140 through the use of optical sensor 205. Once roller mark 212 is detected, a variable (SCREEN COUNT) is initialized to 1 to indicate that one "screen's worth" of transparent film 120 has been used. With this step, the initialization mode of motor controller 140 is complete.

The operational mode of motor controller 140 begins in block 264 where motor controller 140 determines whether SCREEN COUNT exceeds a predetermined number of screens (K). The check to determine whether SCREEN COUNT exceeds K allows motor controller 140 to notify a service entity that transparent film 120 is low and in need of replenishment [see block 266]. The value chosen for K depends upon the size of roller 105 (i.e., the amount of transparent film 120 placed on roller 110 at the time of manufacture). For example, if it is determined that a new roller 110 contains one hundred "screen's worth" of transparent film 120, the value chosen for K may be 90. This would allow service personnel to attend to the condition before the supply of transparent film 120 was completely depleted.

Regardless of whether a "low film" alert has been dispatched, motor controller 140 proceeds to block 270 where it waits for an ADVANCE event from computer 125 or an internally generated CHECK FILM event. Those skilled in the art will understand that these types of events can be generated by any number of means and that the present invention is not limited to any particular means. However, in the preferred embodiment, THE ADVANCE event is generated through the use of a counter (ADVANCE COUNT) and the CHECK FILM event is generated through the use of a timer (CHECK FILM).

A check film event results from the expiration of the CHECK FILM timer that is set by motor controller 140. When a "check film" event is received, motor controller 140 "wakes-up," checks for the presence of transparent film 120 via pressure sensors 202 [block 272], and either proceeds to notify a service entity of the problem [block 294] and terminate [block 296] or resets the CHECK FILM timer [block 273] and returns back to block 270 to await further events.

The ADVANCE COUNT is maintained by operating system 143. Each time a user of kiosk 100 executes a transaction or otherwise uses kiosk 100, operating system 143 increments the ADVANCE COUNT by one (steps not shown). When the ADVANCE COUNT exceeds a specified threshold, operating system 143 issues an ADVANCE event to Motor controller 140. Upon receipt of the ADVANCE event in block 270, motor controller 140 sets an internal counter (ROLLER MARK COUNTER) to zero (0) [block 268] and uses optical sensor 205 to determine whether roller mark 212 is present [block 274]. Since transparent film 120 is itself nondescript, roller mark 212 is used to properly position transparent film 120. The movement of transparent film 120 by stepper motor 107 causes cylinder wheel 210 to rotate counter clockwise. Motor controller 140 uses roller mark 212 and optical sensor 205 to determine a current position of transparent film 120 and to dispense a new "screen's worth" of transparent film 120. The following text is a more detailed treatment of the positioning of transparent film 120 by motor controller 140.

If motor controller 140 does detect roller mark 212 in block 274, motor controller 140 advances stepper motor 107 one step [block 276] and uses pressure sensors 202 to determine whether transparent film 120 is present [block 278]. If not, motor controller 140 will, as before, notify a service entity [block 294] and terminate [block 296]. However, assuming that transparent film 120 is present, motor controller 140 returns to block 274 where it once again determines whether roller mark 212 is detected by optical sensor 205. This iteration through blocks 274, 276, and 278 is continued until roller mark 212 is not detected in block 274. These iterative process places transparent film 120 one step beyond the position identified by roller mark 212. In most cases, the entire process will require no more that three steps of stepper motor 107.

Once transparent film 120 is positioned such that roller mark 212 can no longer by detected, motor controller 140 again checks for roller mark 212 [block 280], advances stepper motor 107 one step [block 282], checks for the presence of transparent film 120 [block 284], and returns back to block 280 to once again look for roller mark 212. This iterative process continues until roller mark 212 is detected in block 280. Once roller mark 212 is detected, motor controller 140 increments ROLLER MARK COUNT by one (1) [block 286] and then determines whether ROLLER MARK COUNT exceeds a predetermined number (N). The number chosen for N represents the number of roller mark 212 detections that equal a "screen's worth" of transparent film 120. If ROLLER MARK COUNT does not exceed N, control returns to block 274 where the process of moving transparent film 120 the circumference of cylinder wheel 210 begins anew. If ROLLER MARK COUNT does indeed exceed N, motor controller 140 sets the ADVANCE COUNT to zero [block 290], increments SCREEN COUNT by one (1) [block 292], and returns to block 264 where processing of the operational mode of motor controller 140 continues as described above.

Beyond the primary embodiment, there are several alternate embodiments which fall within the spirit of the present invention. In particular, there are several alternate advancing means which can be used. In one alternate embodiment, a knob or other device is affixed to take-up roller 105. A technician can then use this knob or similar device to manually advance transparent film 120 without the need for a computer controller motor.

Another alternate advancing means is the use of a timer. The ADVANCE EVENT is generated by operating system 143 at the expiration of a preset timer. To accomplish this, one skilled in the art need only replace block 290 on FIG. 2B with suitable programming to cause a timer to be set to a predetermined value. When the timer expires, operating system 143 generates an ADVANCE EVENT and the processing continues as in the primary embodiment.

Another alternate advancing means embodiment calls for the addition of an opacity sensor near or around guide roller 220 and an additional stepper motor. The additional stepper motor would engage source roller 110 in the same way as stepper motor 107 engages take-up roller 105. In addition, motor controller 140 is suitably programmed to advance transparent film 120 to a point where the added opacity sensor can determine whether the opacity of transparent film 120 exceeds a predetermined level. If it does, transparent film 120 is advanced until a new "screen's worth" of material covers display 115. If the detected opacity level does not exceed this predetermined level of opacity, motor controller 140 uses the additional stepper motor to return transparent film 120 to its original position.

Although a specific embodiment along with some alternate embodiments have been disclosed, it will be understood by those skilled in the art that additional variations in form and detail may be made within the scope of the following claims.

What is claimed is:

1. A self cleaning display mechanism, said self cleaning display mechanism comprising:

a display, said display having a front side and a front surface;

source means, said source means containing a supply of transparent film;

take-up means, said transparent film being stretched from said source means to said take-up means such that said transparent film contacts said front surface;

advancing means for advancing said transparent film from said source means to said take-up means and across said front surface, wherein said advancing means comprise a stepper motor and wherein said stepper motor is controlled by a computer;

detecting means for detecting when said supply of transparent film contained on said source means has been exhausted; and message sending means for sending an external message that indicates that a new supply of said transparent film is needed by said self cleaning display mechanism, said external message being electronically dispatched to an external device which is responsible for receiving said external message.

2. The self cleaning display mechanism of claim 1 further comprising:

detecting means for detecting when said transparent film is broken; and message sending means for sending an electronic message that indicates that said transparent film has been broken, said external message being electronically dispatched to an external device which is responsible for receiving said external message.

3. The self-cleaning display mechanism of claim 1 wherein said transparent film is pre-treated with a substance that is transmitted to a user's skin upon contact with said transparent film.

4. The self cleaning display mechanism of claim 1 wherein said stepper motor is periodically activated by said computer through the use of a timer.

5. The self cleaning display mechanism of claim 1 wherein said stepper motor is periodically activated by said computer when said computer determines that said touch screen has been used more than a predetermined number of times.

6. A kiosk, said kiosk comprising:

a display, said display having a front side and a front surface;

source means, said source means containing a supply of transparent film;

take-up means, said transparent film being stretched from said source means to said take-up means such that said transparent film contacts said front surface;

advancing means for advancing said transparent film from said source means to said take-up means and across said front surface, wherein said advancing means comprise a stepper motor and wherein said stepper motor is controlled by a computer;

detecting means for detecting when said supply of transparent film contained on said source means has been exhausted; and message sending means for sending an external message that indicates that a new supply of said transparent film is needed by said self cleaning display mechanism said external message being electronically dispatched to an external device which is responsible for receiving said external message.

7. The kiosk of claim 6 wherein said display is a touch screen display.

8. The kiosk of claim 6 further comprising:

detecting means for detecting when said transparent film is broken; and message sending means for sending an electronic message that indicates that said transparent film has been broken, said external message being electronically dispatched to an external device which is responsible for receiving said external message.

9. The kiosk of claim 6 wherein said transparent film is pretreated with a substance that is transmitted to a user's skin upon contact with said transparent film.

10. The kiosk of claim 6 wherein said stepper motor is periodically activated by said computer through the use of a timer.

11. The kiosk of claim 6 wherein said stepper motor is periodically activated by said computer when said computer determines that said touch screen has been used more than a predetermined number of times.

12. A method for cleaning a display, said method comprising the steps of:

stretching transparent film between source means and take-up means and across a front surface of said display;

advancing said transparent film from said source means to said take-up means, said advancing step being performed by a computer system, detecting when a supply of transparent film contained on said source means has been exhausted; and sending an external message that indicates that a new supply of said transparent film is needed, said external message being electronically dispatched to an external device which is responsible for receiving said external message.

13. The method of claim 12 further comprising the steps of:

detecting when said transparent film is broken; and sending an external message that indicates that said transparent film has been broken, said external message being electronically dispatched to an external device which is responsible for receiving said external message.

14. A self cleaning display mechanism, said self cleaning display mechanism comprising:

a display, said display having a front side and a front surface;

source means, said source means containing a supply of transparent film;

take-up means, said transparent film being stretched from said source means to said take-up means such that said transparent film contacts said front surface;

computer controlled advancing means responsive to an opacity sensor for advancing said transparent film from said source means to said take-up means and across said front surface, wherein said advancing means comprise at least one stepper motor;

detecting means for detecting when said supply of transparent film contained on said source means has been exhausted; and message sending means for sending an external message that indicates that a new supply of said transparent film is needed by said self cleaning display mechanism, said external message being electronically dispatched to an external device which is responsible for receiving said external message.

15. A kiosk, said kiosk comprising:

a display, said display having a front side and a front surface;

source means, said source means containing a supply of transparent film;

take-up means, said transparent film being stretched from said source means to said take-up means such that said transparent film contacts said front surface;

computer controlled advancing means responsive to an opacity sensor for advancing said transparent film from said source means to said take-up means and across said front surface, wherein said advancing means comprise at least one stepper motor;

detecting means for detecting when said supply of transparent film contained on said source means has been exhausted; and message sending means for sending an external message that indicates that a new supply of said transparent film is needed by said self cleaning display mechanism, said external message being electronically dispatched to an external device which is responsible for receiving said external message.

* * * * *